United States Patent
Harris et al.

Patent Number: 6,135,234
Date of Patent: Oct. 24, 2000

[54] DUAL MODE MULTIPLE-ELEMENT RESONANT CAVITY PIEZOCERAMIC BOREHOLE ENERGY SOURCE

[75] Inventors: Jerry M. Harris, Stanford, Calif.; Bruce P. Marion, Houston; Duane Canny, Spring, both of Tex.

[73] Assignee: Gas Research Institute, Chicago, Ill.

[21] Appl. No.: 09/002,474

[22] Filed: Jan. 2, 1998

Related U.S. Application Data

[60] Provisional application No. 60/034,585, Jan. 2, 1997.

[51] Int. Cl.$^7$ ........................................ G01V 1/40
[52] U.S. Cl. ............................ 181/106; 367/25; 367/911
[58] Field of Search ................................... 181/102, 104, 181/106, 111, 113, 122; 367/25, 31, 911; 166/249, 177.1, 177.2, 177.6

[56] References Cited

U.S. PATENT DOCUMENTS

| | | |
|---|---|---|
| 4,319,345 | 3/1982 | Dennis . |
| 4,400,805 | 8/1983 | Nadler . |
| 4,415,998 | 11/1983 | Blizard . |
| 4,493,062 | 1/1985 | Mallett . |
| 4,512,402 | 4/1985 | Kompanek et al. ..................... 166/249 |
| 4,850,450 | 7/1989 | Hoyle et al. ............................ 181/102 |
| 4,890,687 | 1/1990 | Medlin et al. . |
| 4,899,844 | 2/1990 | Katahara et al. ....................... 181/106 |
| 5,081,391 | 1/1992 | Owen . |
| 5,115,880 | 5/1992 | Sallas et al. . |
| 5,184,332 | 2/1993 | Butler . |
| 5,283,768 | 2/1994 | Rorden . |
| 5,331,604 | 7/1994 | Chang et al. . |
| 5,360,951 | 11/1994 | Turpening . |

*Primary Examiner*—Khanh Dang
*Attorney, Agent, or Firm*—Pauley Petersen Kinne & Fejer

[57] ABSTRACT

A dual mode multiple-element resonant cavity piezoceramic borehole energy source is disclosed. Thus, a source for generating detectable seismic waves in a wellbore is provided which is capable of transmitting useful signals over long distances between the source and the related receiver or receivers. A liquid-filled elongated column is provided which defines a longitudinal axis and has a resonant frequency. A resonator comprising at least one substantially cylindrical piezoelectric element having an axis approximately parallel to the axis of the borehole for inducing seismic waves in the borehole is furnished. The resonator is constructed and arranged for vibrating at the first resonant frequency, and is also constructed and arranged for vibrating at a second frequency in a hoop mode to generate seismic waves having the second frequency.

8 Claims, 12 Drawing Sheets

DUAL MODE MULTIPLE-ELEMENT RESONANT CAVITY PIEZOCERAMIC BOREHOLE ENERGY SOURCE

RELATED APPLICATIONS

This application claims the benefit of U.S. Provisional patent application Ser. No. 60/034,585, filed Jan. 2, 1997.

FIELD OF THE INVENTION

The present invention relates to a source for producing acoustic waves. More particularly, the present invention relates to an energy source for generating detectable seismic waves in a wellbore. The present invention is capable of transmitting useful signals over long distances between the source and the related receiver or receivers.

BACKGROUND OF THE INVENTION

Various industries, such as oil exploration and mining, require techniques for investigating underground conditions without the expensive proposition of random drilling or excavation. Various techniques have been developed for exploring subsurface conditions with a minimum of effort and expense. One such technique is borehole seismic logging. Borehole seismic logging techniques involve lowering an energy source within a deep borehole, which is a hole several inches wide and hundreds of thousands of feet deep drilled into the earth's surface. The energy source is designed to generate seismic waves in the borehole. These seismic waves are detected by one or more receivers which are placed in other boreholes, on the earth's surface, or in the same borehole where the energy source is located. The seismic waveforms that are picked up by the receiver or receivers, when compared to the known output of the energy source and processed with seismic data processing methods, can give the trained user the ability to map the underground formation to locate oil and gas.

The applications of these energy sources and receivers require that the energy source and receiver be capable of selective generation and detection of specific frequencies, or bands of frequencies, within the broad acoustical spectrum. Increasing the distance between the energy source and the receiver, while still maintaining the ability to detect the seismic waves from the energy source, makes borehole seismic logging techniques less expensive. While higher frequencies (2000 kHz and higher) are used in SONAR and similar acoustic techniques under water, experimentation has shown that the earth attenuates seismic waves above about 2 kHz, rendering frequencies above that range less useful in borehole seismic logging when the energy source and the receiver are relatively far apart (more than 700 feet).

Cylindrical piezoelectric crystals have been used as transducers to create seismic electric signal of a known characteristic, which is amplified by an associated power amplifier, to drive piezoceramic material located within the borehole. The electric signal excites the piezoelectric material causing the cylinder to change diameter and emit seismic waves in the hoop (or barrel) mode. Lengthening the ceramic cylinder creates seismic waves of lower frequencies. These arrangements require multiple crystals to general seismic waves of desired relative amplitude over a broad frequency range. Prior art energy sources lacked significant energy output below 700 to 1,000 Hz due to the "piezoelectric effect" in which power output from a piezoelectric material decreases as frequency is lowered.

Thus, a number of apparatus have been employed in the past in this field. For example, U.S. Pat. No. 4,319,345, entitled "Acoustic Well-Logging Transmitting and Receiving Transducers" and issued on Mar. 9, 1982 to Dennis, discloses an acoustic well-logging transmitting transducer employing a transmitter portion having stacked piezoceramic rings and a resonating metallic plate. The dimensions of the plate determine the frequency of resonation. A conical acoustic reflector causes reflections to impinge omni-directionally on the wall of the borehole at an angle to enhance shear wave component propagation.

Additionally, U.S. Pat. No. 4,400,805, entitled "Acoustically Filtered Transducer" and issued on Aug. 23, 1983 to Nadler, discloses an acoustic transducer including a pressure tight vessel having a window therein. The window is transparent to acoustic wave energy. A gas is disposed in the vessel, and an electromechanical transducer is located within the vessel at an antinode for a resonant wave of the gas. A port communicates with the interior of the vessel, with a pressure control coupled to the port and to a source of the gas for controlling the pressure of the fluid within the vessel.

Another apparatus, disclosed in U.S. Pat. No. 4,415,998, entitled "Segmented Acoustic Transmitter for Broad Frequency Investigation of a Borehole" and issued on Nov. 15, 1983 to Blizard, discloses cylindrical piezoelectric crystals used as a transducer to create a seismic electric signal. The signal is amplified by an associated power amplifier to drive piezoceramic material located within the borehole. The electric signal excites the piezoelectric material causing the cylinder to change diameter and emit seismic waves in the hoop (or barrel) mode. Lengthening the ceramic cylinder creates seismic waves of lower frequencies. These arrangements require multiple crystals to general seismic waves of desired relative amplitude over a broad frequency range.

U.S. Pat. No. 4,493,062, entitled "Resonant Frequency Modification of Piezoelectric Transducers" and issued on Jan. 8, 1985 to Mallett, discloses a transducer modification circuit for use with an acoustic transmitter in an acoustic well logging tool. The circuit modifies the diameter resonant frequency of a piezoelectric transducer, thereby expanding the frequency range downward for the transmitter transducer by moving the diameter resonant frequency.

In U.S. Pat. No. 4,890,687, entitled "Borehole Acoustic Transmitter" and issued on Jan. 2, 1990 to Medlin, et al., an acoustic transmitter for use in a borehole logging tool that employs multiple Helmholtz resonators stacked such that apertures in opposite side of each of the resonators are in linear alignment is disclosed. Thus, increased acoustic energy output over a broad range of low frequency seismic frequencies is provided.

Yet another apparatus known in the field is disclosed in U.S. Pat. No. 5,081,391, entitled "Piezoelectric Cylindrical Transducer for Producing or Detecting Asymmetrical Vibrations" and issued on Jan. 14, 1992 to Owen. Here, a transducer constructed of a cylindrical shell and at least one pair of piezoelectric sections is disclosed. Each member of the pair of piezoelectric sections is rigidly bonded to the wall of the cylinder, in a position diametrically opposed from the other member of the pair. Operation as an acoustic source transducer is accomplished by electrically energizing each piezoelectric section to cause the piezoelectric sections to elongate and contract, respectively out of phase with one another, along the cylinder length. This causes flexural bending of the cylinder, with the bending being asymmetrical with respect to the cylinder axis. The transducer thus approximates an acoustic dipole radiator. Use of more than one pair of piezoelectric sections permits use of the transducer to approximate higher order polarized acoustic radiators.

In U.S. Pat. No. 5,115,880, entitled "Piezoelectric Seismic Vibrator with Hydraulic Amplifier" and issued on May 26, 1992 to Sallas, et al., a piezoelectric seismic vibrator using a hydraulic system to amplify the longitudinal displacement which results from the application of a voltage to a stack of piezoelectric elements is shown. The stack of piezoelectric elements is mounted to bear upon a power piston which, in turn, acts upon a substantially incompressible fluid, such as mercury. A drive piston has a cross-sectional area which is smaller than the area of the power piston. The pressure within the fluid system acts to amplify the longitudinal displacement of the piezoelectric elements. The drive piston movement is coupled mechanically or fluidically to the earth to generate seismic waves. Each stack of piezoelectric elements is disposed within a fluid filled chamber which is pressurized by communicating with the borehole fluids.

U.S. Pat. No. 5,184,332, entitled "Multiport Underwater Sound Transducer" and issued on Feb. 2, 1993 to Butler, discloses a multiport underwater sound transducer including a hollow resilient housing enclosing a volume with at least two ported resonant chambers and a transduction driver contained within the volume. Opposite sides of the driver drive the two chambers. The two ports are set to resonate at slightly different frequencies. The transducer produces an additive output at frequencies between the two slightly different frequencies due to phase reversals of oppositely phased sound waves.

A transducer to provide acoustic transmission in a borehole is shown in U.S. Pat. No. 5,283,768, entitled "Borehole Liquid Acoustic Wave Transducer" and issued on Feb. 1, 1994 to Rorden. The transducer has magnetic circuit gaps and electrical windings that provide the power necessary for acoustic operation in a borehole.

U.S. Pat. No. 5,331,604, entitled "Methods and Apparatus for Discrete-Frequency Tube-Wave Logging of Boreholes" and issued on Jul. 19, 1994 to Chang, et al., discloses a source transducer emitting acoustic waves of at least one discrete frequency which includes propagation of tube waves in a borehole. Acoustic energy of the tube waves is received at multiple receiver locations. The multiple receiver locations are spaced apart from each other and from the source transducer location. At each receiver location, the complex pressure response of a receiver to the received acoustic energy of the tube waves is detected relative to the phase reference. The detected complex pressure response is processed to determine phase velocity of the tube waves in the borehole as a function of frequency, to determine attenuation of the tube waves in the borehole as a function of frequency and/or to determine attenuation and amplitude as functions of frequency. Tube wave reflection coefficients near fractures and bed boundaries are thus calculable.

Finally, U.S. Pat. No. 5,360,951, entitled "Earth Reaction Seismic Source" and issued on Nov. 1, 1994 to Turpening, discloses a source for emission of seismic energy waves into subsurface earth formations. Electrically energized signal generators are mounted between two plate members. One of the plate members is anchored to the earth surface and the other rests on and is coupled with the earth surface. The source is moveable between shotpoint locations and provides controllable seismic signals of improved bandwidth and quality.

For the foregoing reasons, there has been defined a long felt and unsolved need for a resonant cavity piezoceramic borehole energy source that is easily installed, inexpensive to manufacture and compact enough to approximate a point source of acoustic energy.

In contrast to the foregoing, the present invention constitutes a dual mode multiple-element resonant cavity piezoceramic borehole energy source that seeks to overcome the problems discussed above, while at the same time providing a simple, easily constructed apparatus that is readily adapted to a variety of applications.

SUMMARY OF THE INVENTION

Briefly, the present invention comprises a dual mode multiple-element resonant cavity piezoceramic borehole energy source.

In analyzing borehole data, the energy source is assumed to be a point-source for purposes of the analysis. It is desirable, therefore, to make the energy source as small as possible to more accurately reflect the assumed experimental condition. Since boreholes are typically as small as 4.5 inches in internal diameter, borehole energy sources are typically long, small-diameter cylinders. Efforts to limit the size of the energy source typically involve efforts to limit the longitudinal length of the energy source. The boreholes are typically deep, causing the energy source to operate in a corrosive environment, at elevated temperatures and pressures present below the earth's surface.

The piezoelectric elements must be maintained in a environment that is isolated from the liquid and corrosive materials often present in a borehole. The isolation of the piezoelectric elements, however, must occur in a manner that will interfere minimally, if at all, with the seismic waves produced by the energy source. Prior art energy sources used rubber or elastomeric bladders to house the piezoceramic elements. While these rubber bladders isolate the piezoceramic elements, they have limitations in their ability to withstand the corrosive nature of the borehole and the effect of elevated temperatures and pressures present below the earth's surface.

Because of the harsh environment of the borehole, and the fact that the energy source is typically lowered into the borehole by means of a cable or thick wire, it is desirable to minimize the number of parts and to simplify the design as much as possible. A lighter energy source with fewer parts is desirable. Simplicity of design is also desirable because the energy sources are typically used in the field, without ready replacements and without access to repair facilities.

Accordingly, there remains a need for a durable high output borehole energy source of a simplified design, that is capable of generating a broadband frequency signal and operating within the corrosive environment of the borehole.

Thus, it is an object of the present invention to provide a dual mode multiple-element resonant cavity piezoceramic borehole energy source that is compact in both its structure and usage and can be used in a multiplicity of applications.

A further object of the present invention is to provide a dual mode multiple-element resonant cavity piezoceramic borehole energy source that is simply designed and inexpensive to manufacture, install, maintain and use.

Yet a further object of the present invention is to provide a dual mode multiple-element resonant cavity piezoceramic borehole energy source that provides a compact structure closely approximating the assumed point source of acoustic energy.

A further object of the present invention is to provide a dual mode multiple-element resonant cavity piezoceramic borehole energy source that can accommodate a wide variety of borehole depths and ambient conditions therein, thereby permitting use in many different field environments.

Still a further object of the present invention is to provide a dual mode multiple-element resonant cavity piezoceramic borehole energy source that offers a wider range of operability due to its combination of integrated structure and ability to accommodate varied field conditions.

These and other objects, advantages and features of the present invention will be apparent from the detailed description that follows.

DETAILED DESCRIPTION OF THE PREFERRED EMBODIMENT

Figure 1:
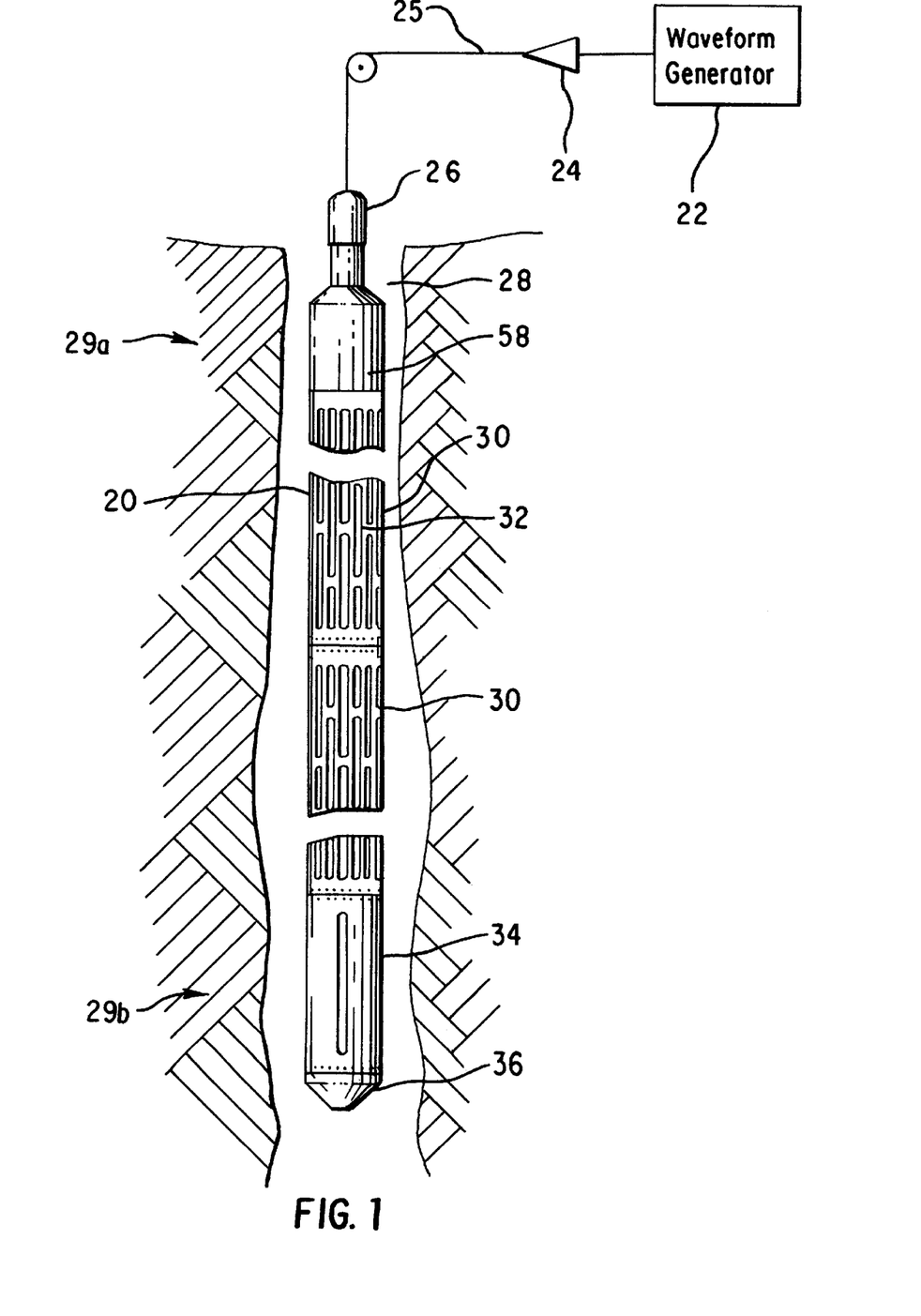
FIG. 1 illustrates a schematic view of a preferred embodiment of the present invention.

FIG. 1 illustrates a preferred embodiment of an energy source according to the present invention. The dual mode resonant cavity source 20 receives electrical input from a waveform generator 22, which is amplified by a power amplifier 24. The waveform generator 22 and power amplifier 24 are located usually at or near the earth's surface, distant from the resonant cavity source 20. The waveform generator 22 and the power amplifier 24 are known in the art, and their selection is not crucial to practicing the invention. For example, the waveform generator 22 may be a 20/20 Frequency Synthesizer manufactured by Analogic. The power amplifier 24 may be a linear amplifier, such as one manufactured by Instruments, Inc.

The resonant cavity source is suspended by a wire-line 25, which serves to suspend the resonant cavity source 20 within the borehole 28, and to house two leads which bring the electrical pulse or signal from the power amplifier 24 to the resonant cavity source 20. A coupling head 26 provides electrical connection between the wire-line 25 and the resonant cavity source 20. The coupling head 26 is also known in the art and, therefore, its selection is not crucial to practicing the invention. For example, the single conductor GO head manufactured by Applied Electronics can be used.

The source 20 has an upper end 29a and a lower end 29b. Exo-skeleton sections 30 define a portion of the outer surface of the source 20. When the source is operational, acoustic waves generated by the active piezoceramic elements contained within the exo-skeleton 30 pass through elongated apertures 32. It will be appreciated that the invention may include multiple exo-skeleton sections 30, or a single exo-skeleton section 30. The exo-skeleton 30 of the preferred embodiment has a inner diameter of approximately 3⅝ inches, and is about ½ inch thick. The selected diameter is suitable for use in most production oil and gas wells which are cased with 5½ inch O. D. steel casing. For other applications the tool and its internal components can be scaled in size to increase or decrease output power levels. The length of the exo-skeleton 30 will vary according to the desired operational frequencies of the resonant cavity source 20.

The resonant cavity source 20 has a bellows housing 34 located distal to and connected to the exo-skeleton 30. The bellows housing 34 contains sealed bellows that allow a low velocity liquid within the source 20 to expand and contract as a result of elevated temperatures within the borehole 28 and the differential expansion between the fluid inside the source and the fluid inside the borehole. Nose cone 36 is located at the lower end 29b of the source 20. Conductor crossover 58 is located at the upper end 29a of the source 20.

Figure 2:
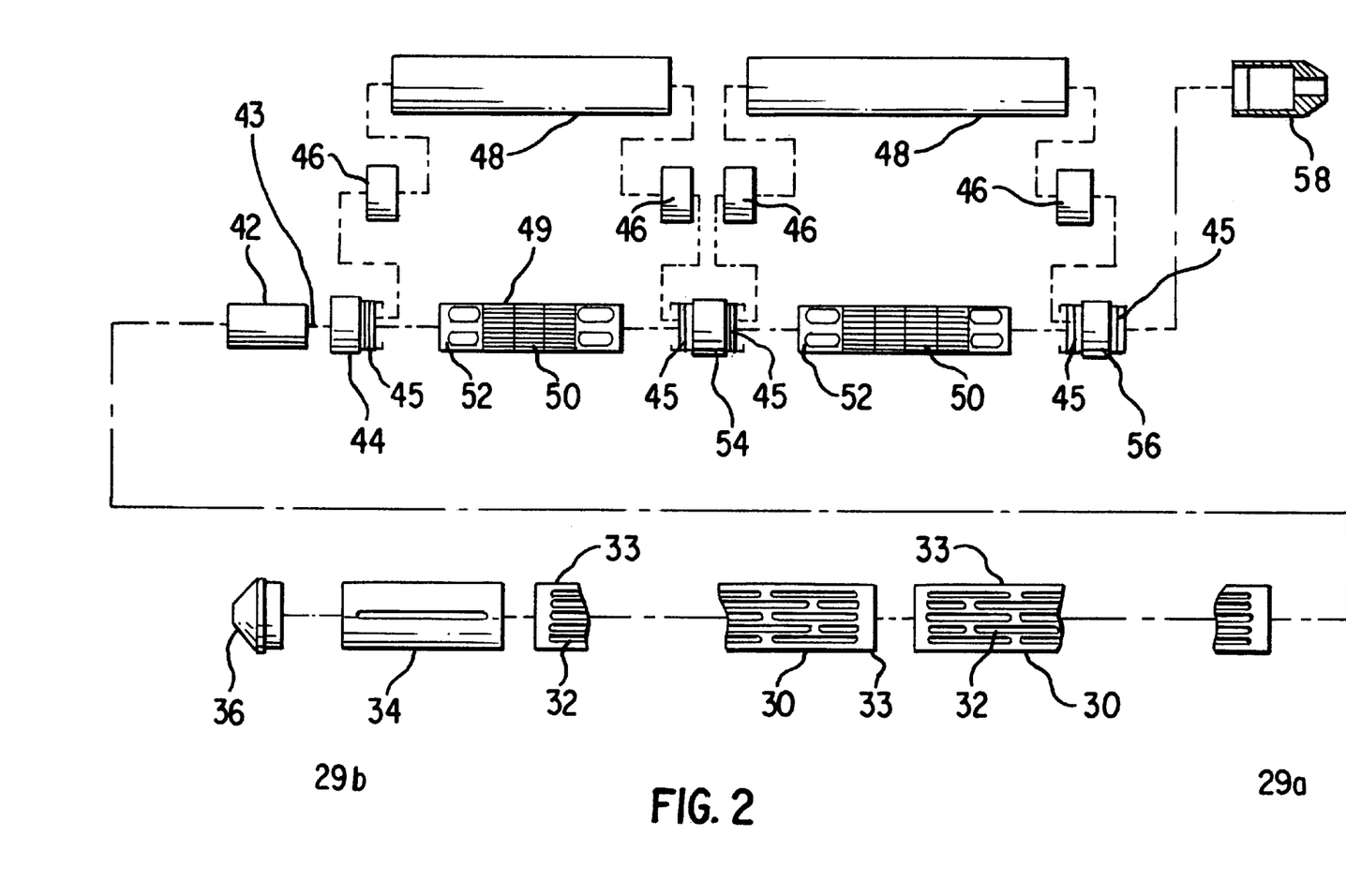
FIG. 2 illustrates an exploded assembly schematic of the embodiment of FIG. 1.
Figure 13:
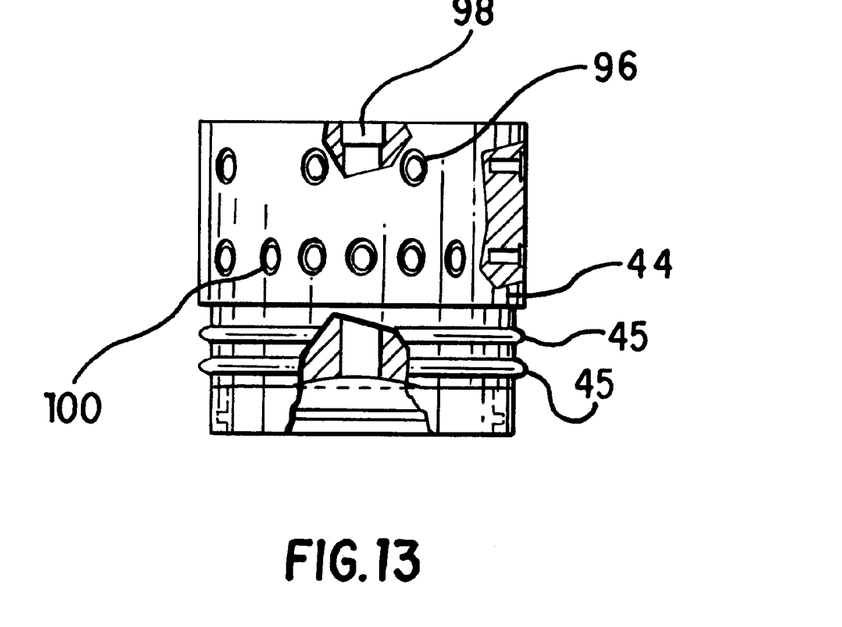
FIG. 13 illustrates a side elevation cut-away view of the bellows bulkhead of FIG. 2.

FIG. 2 is an exploded assembly view of the resonant cavity source 20. Bellows 42 is located within bellows housing 34 when the source 20 is assembled. Nose cone 36 is fastened to lower end of bellows housing 34 with set screws. Bellows bulkhead 44 has an internal channel (shown in FIG. 14) that receives a nipple 43 located on the upper end of the bellows 42. O-rings 45 are located on the upper end of bulkhead 44. Bulkhead 44 is attached to the upper portion of bellows housing 34, and the lower portion of exo-skeleton 30 by means of set screws received by two sets of recesses within the bellows bulkhead 34 (depicted in FIG. 13). O-rings 45 located on the upper portion of the bellows bulkhead 34 sealingly engage the lower portion of a cavity bladder seal ring 46. The upper portion of cavity seal ring 46 fits within metallic bladder 48, and is connected to the bladder 48, for example, by means of a weld. When the source 20 is completely assembled, metallic bladder 48 is located within exo-skeleton 30.

Figure 15:
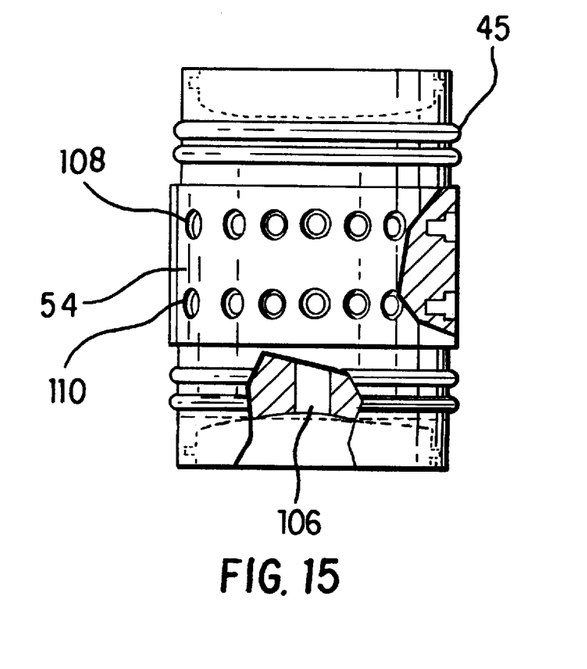
FIG. 15 illustrates a side elevation cut-away view of the coupler bulkhead of FIG. 2.

Piezoceramic crystal cavity 49 is housed within bladder 48. Bladder 48 is connected to coupler bulkhead 54 by means of another cavity bladder seal ring 46. Coupler bulkhead 54 has two sets of recesses about its circumference (shown in FIG. 15). These recesses receive set screws to secure adjacent exo-skeletons 30. It will be appreciated that while the embodiment depicted in the drawings depicts only two crystal cavities 49, with two corresponding exo-skeletons 30, the design may be expanded to include multiple crystal cavities 49 by adding additional coupler bulkheads 54.

Bulkhead upper adapter 56 (more particularly shown in FIG. 16) seals cavity metallic bladder 48 with a cavity bladder seal ring 46 in the same way that bellows bulkhead 44 engages the lower metallic bladder 46. Conductor crossover 58 attaches to threads on the upper portion of bulkhead upper adapter 56, which has internal contact points which allow for transmission of an electrical signal, while maintaining a pressure tight seal in the remainder of the tool. When the entire source 20 is assembled, a pressure tight connection is formed between bellows 42, the internal bulkheads 44 and 54, the metallic cavity bladders 48 and the upper bulkhead 56. Internal passages or bores along the longitudinal axes of the bulkheads 44 and 54 provide fluid communication, and allow for electrical wires to be passed along all of the sealed components. When the entire source 20 is assembled, the pressure tight cavity is filled with an appropriate low velocity fluid, such as Flouranert™, a perfluorinated fluid manufactured by the Minnesota Mining & Manufacturing Co. (3M). These synthetic, highly engineered fluids are characterized in that they are substantially incompressible and are able to withstand rigorous field conditions. It is understood, however, that the selection of fluid is not crucial to practicing the invention. When the internal components of the energy source 20 are assembled, they form a completely sealed unit. The internal components are filled with a low velocity liquid (not shown). The internal components are in fluid communication.

Bellows 42 allows the volume of the sealed chamber to expand and contract in response to external changes in temperature within the borehole. The axial bore resulting from the assembly of the internal components allows for electrical leads to pass from the upper to lower ends of the source 20.

Figure 3:
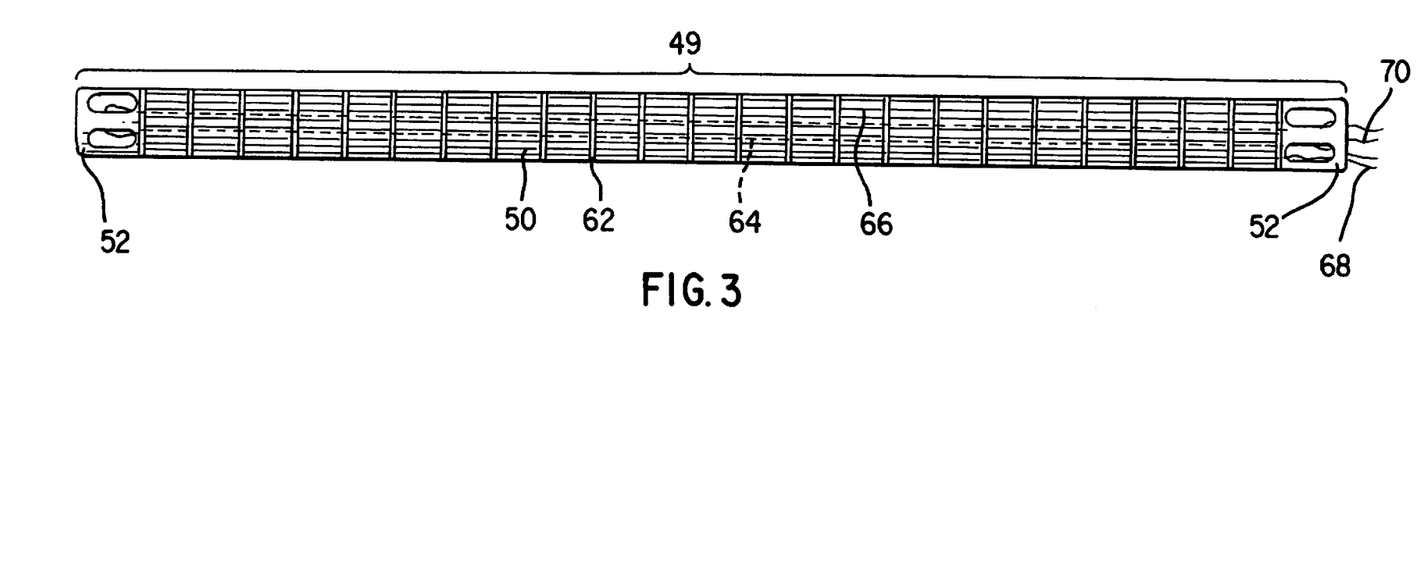
FIG. 3 illustrates an isolated side elevation of the assembled crystal cavity of the embodiment in FIG. 2.
Figure 7:
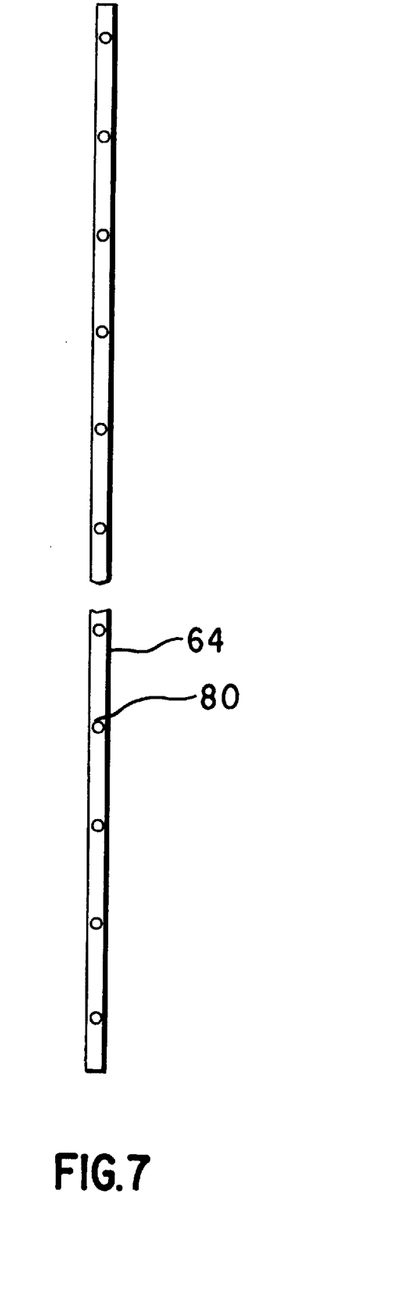
FIG. 7 illustrates a side view of a mounting strut of the embodiment depicted in FIG. 2.

FIG. 3 depicts an assembled piezoceramic crystal cavity 49. Individual piezoceramic crystals 50 are assembled into a long cylindrical shape having a longitudinal axis. The individual crystals 50 are separated by isolation rings 62. Mounting struts 64 run along the length of the cavity 49 parallel to its longitudinal axis. The mounting struts (shown in FIG. 7) have multiple circular openings for receiving a set screw. The mounting strut 64 secures the crystals 50 by engaging corresponding recesses within isolation rings 62. Cavity mounting isolators 52 are located at opposing ends of the cavity 49. Positive leads 68 and negative leads 70 transmit electrical signals from the amplifier 24 to the individual crystals 50.

Figure 4:
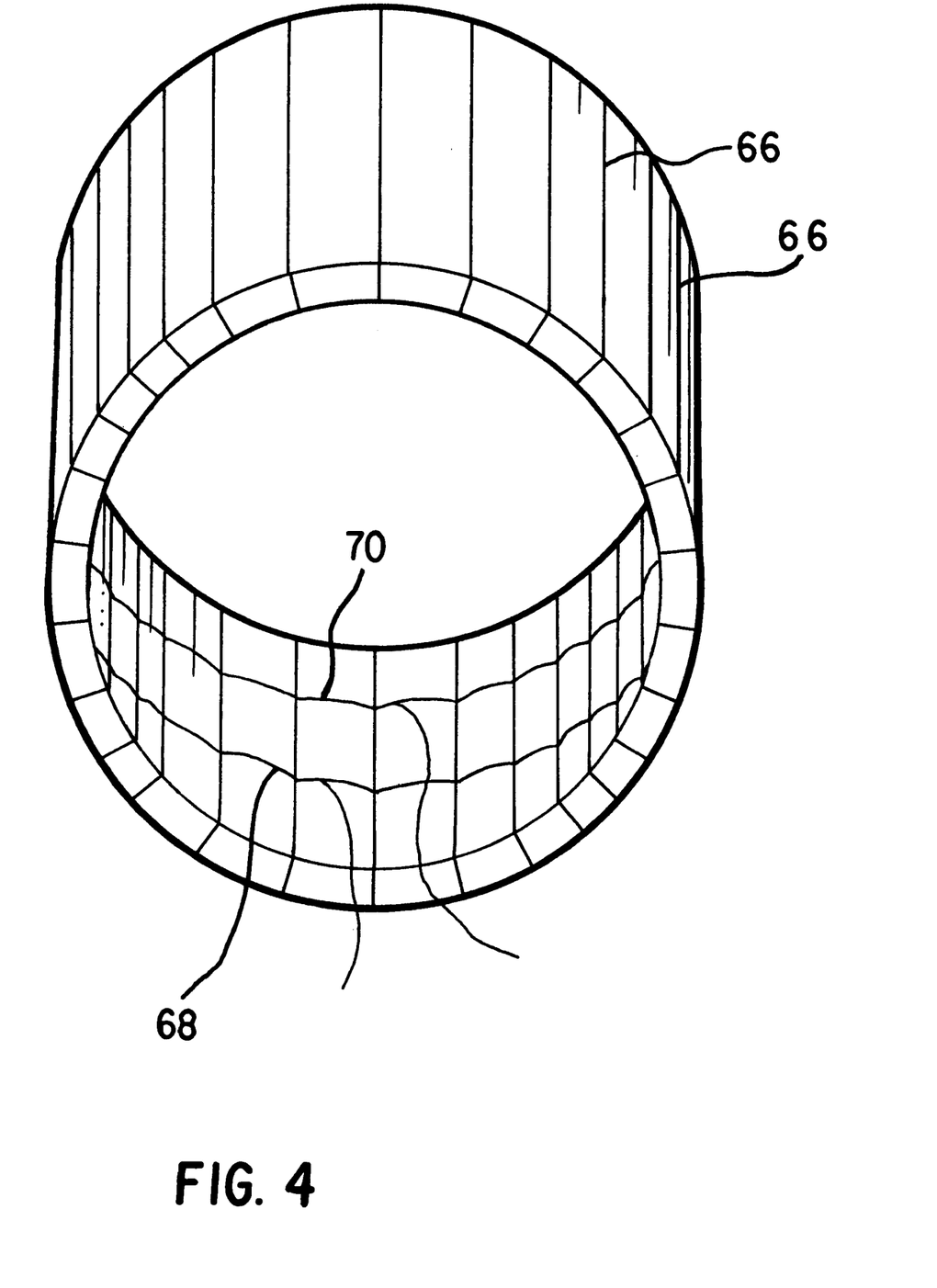
FIG. 4 illustrates a perspective view of an individual crystal of the embodiment of FIG. 2.

FIG. 4 depicts an individual crystal 50 of the crystal cavity 49. Crystal 50 has multiple longitudinal stripes 66. Each crystal 50 has a positive lead 68 and a negative lead 70. Leads 68 and 70 are mounted in loops along the interior surface of crystal 50. When the crystals 50 are assembled into an cavity 49, the leads 68 and 70 are connected in parallel.

Figure 5:
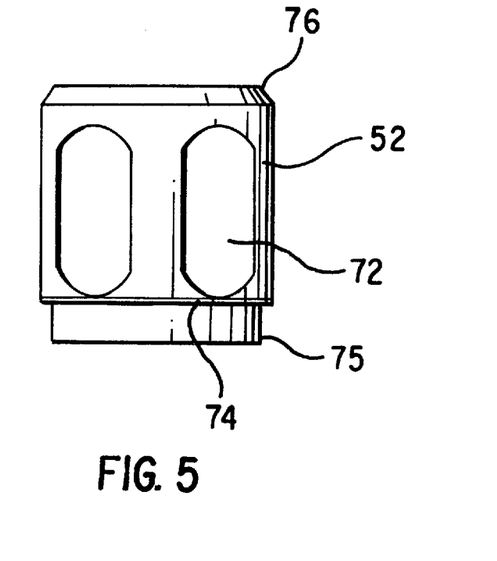
FIG. 5 illustrates an isolated perspective view of a crystal isolator of the embodiment of FIG. 2.

FIG. 5 depicts one cavity mounting isolator 52. The cavity mounting isolator 52 has a chamfered upper portion 76 and a plurality of longitudinal recesses 72. The lower portion of mounting isolator 52 has a lip 74 and a corresponding cylindrical sleeve 75. When assembled into an cavity 49 as depicted in FIG. 3, sleeve 75 fits within the upper portion of the interior of one piezoceramic crystal 50. Leads 68 and 70 pass through cavity mounting 52 to the interior of the assembled cavity 49.

Figure 6:
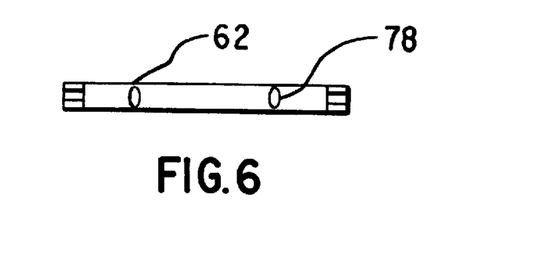
FIG. 6 illustrates an isolated plain view of an isolation ring of the embodiment of FIG. 2.
Figure 6A:
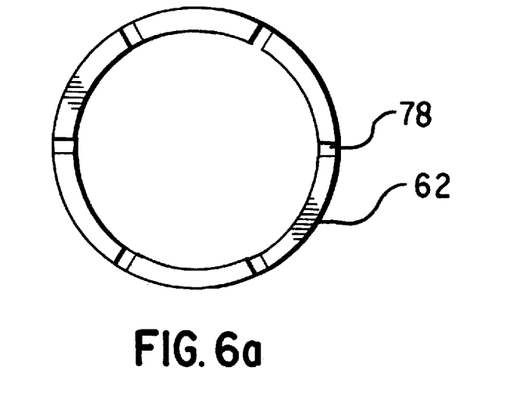
FIG. 6a illustrates an isolated elevation of the embodiment of FIG. 2.

FIGS. 6 and 6a depict an isolation ring 62. The isolation ring 62 has a plurality of recesses 78. When the cavity 49 is assembled, the recesses 78 accept set screws through the recesses 80 in the mounting struts 64 (shown in FIG. 7).

Figure 8:
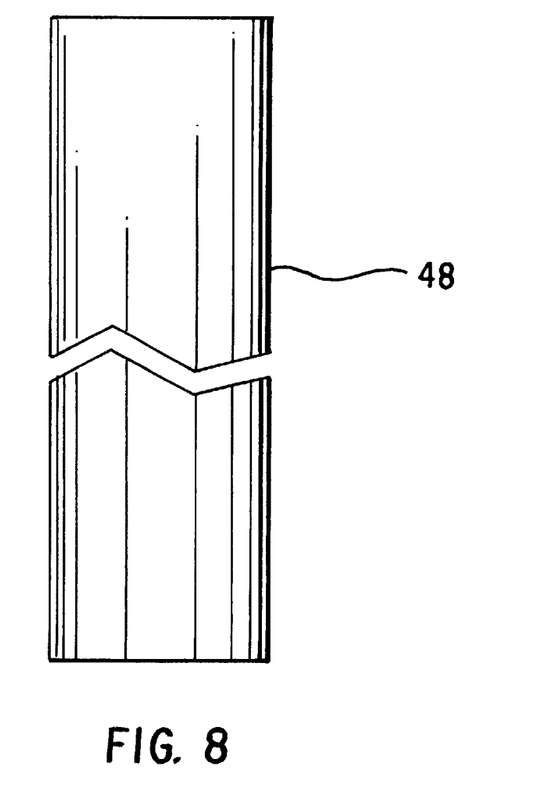
FIG. 8 illustrates a site elevation of a metallic cavity bladder 48 of the embodiment depicted in FIG. 2.

FIG. 8 depicts the cavity metallic bladder 48. The metallic bladder 48 is a hollow cylinder, preferably constructed of corrosion-resistant stainless steel. Although selection of the stainless steel is not crucial to the invention, one example of an acceptable stainless steel source is Inconel™. The metallic bladder 48 of the preferred embodiment has a wall thickness of approximately 0.04 inches.

Figure 9:
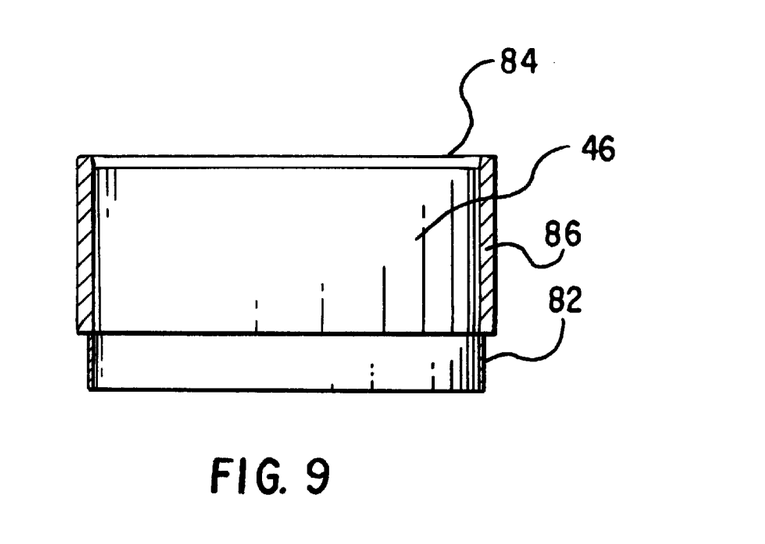
FIG. 9 illustrates a longitudinal section of seal 46 of the embodiment depicted in FIG. 2.
Figure 10:
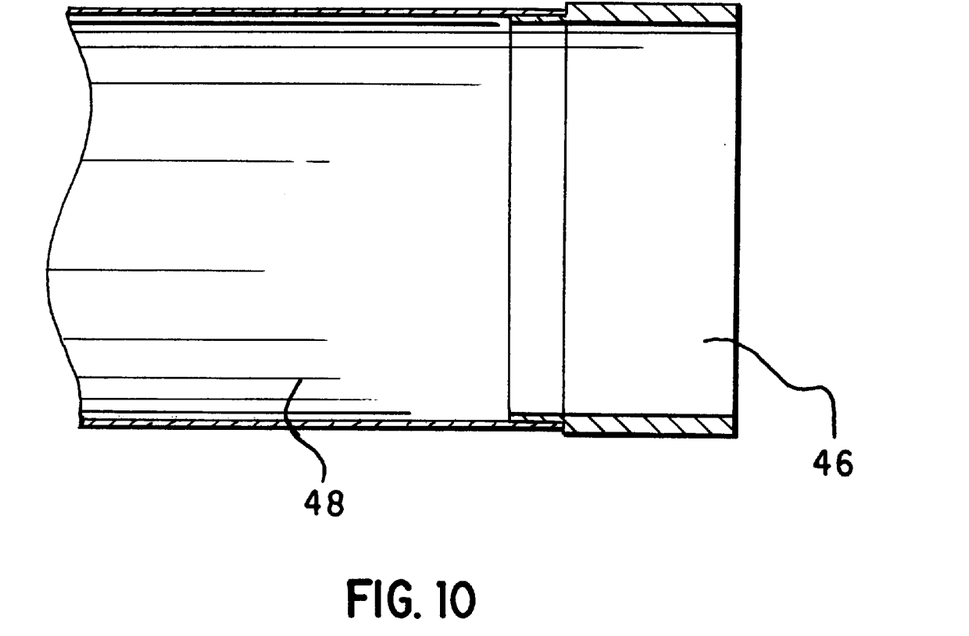
FIG. 10 illustrates a view similar to FIG. 9 showing the metallic cavity bladder engaged with the cavity bladder seal.

FIG. 9 shows the bladder seal ring 46. Seal ring 46 has a thinner sleeve portion 82 and a thicker cylinder 86. Sleeve 82 fits within bladder 48, where it is secured with a weld. Cylinder 86 is adapted to mate with the various O-rings of coupler bulkheads 44, 54 or 56. Chamber 84 along the upper portion of cylinder 86 allows the seal ring 46 to be easily engaged during assembly. FIG. 10 depicts the connection of bladder 48 to bladder seal ring 46, for example by means of a weld.

Figure 11:
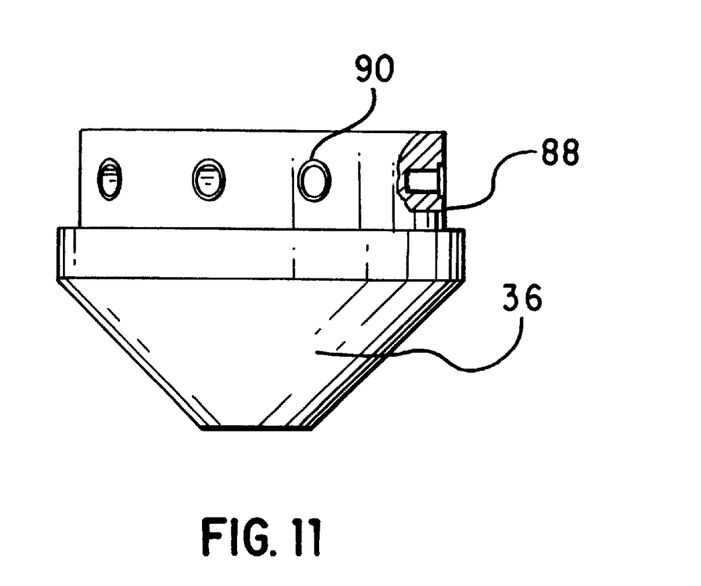
FIG. 11 illustrates a side elevation of the nose cone 36 of the embodiment of FIG. 1.

FIG. 11 is an elevation of the nose cone 36. The nose cone 36 has an upper cylindrical portion 88 that when assembled, fits within the lower portion of bellows housing 34. The plurality of recesses 90 within cylindrical portion 88 allow the nose cone 36 to be secured to bellows housing by screws passed through the lower recesses 94a (shown in FIG. 12) of the bellows housing 34.

Figure 12:
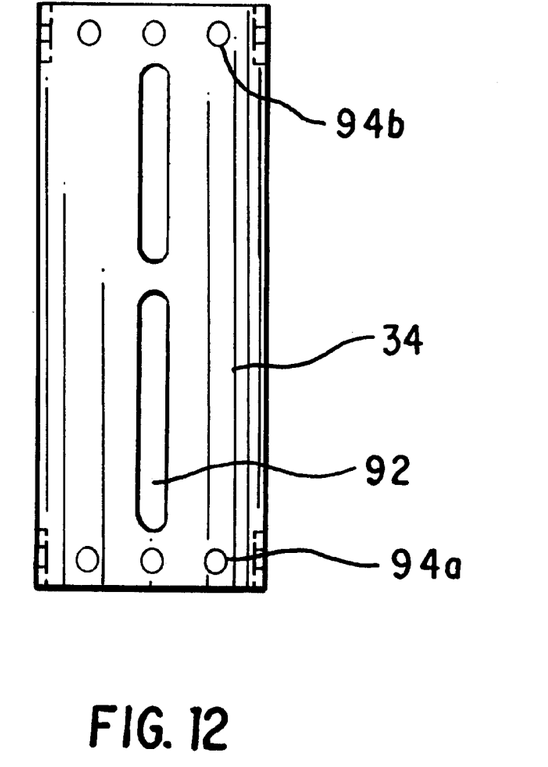
FIG. 12 illustrates a side elevation of the bellows housing of FIG. 2, with phantom lines indicating the inside diameter of the bellows housing.

Turning now to FIG. 12, bellows housing 34 has longitudinal apertures 92. Upper recesses 94b of bellows housing 34 correspond to recesses 96 in bellows bulkhead 44 (shown in FIG. 13) allowing screws to secure bellows housing 34 to bellows bulkhead 44. Internal channel 98 passes through the interior of bellows bulkhead 44, and receive the nipple 43 of the bellows 42. Channel 98 allows for fluid communication between the bellows 42 and the sealed interior of the energy source 20.

Figure 14:
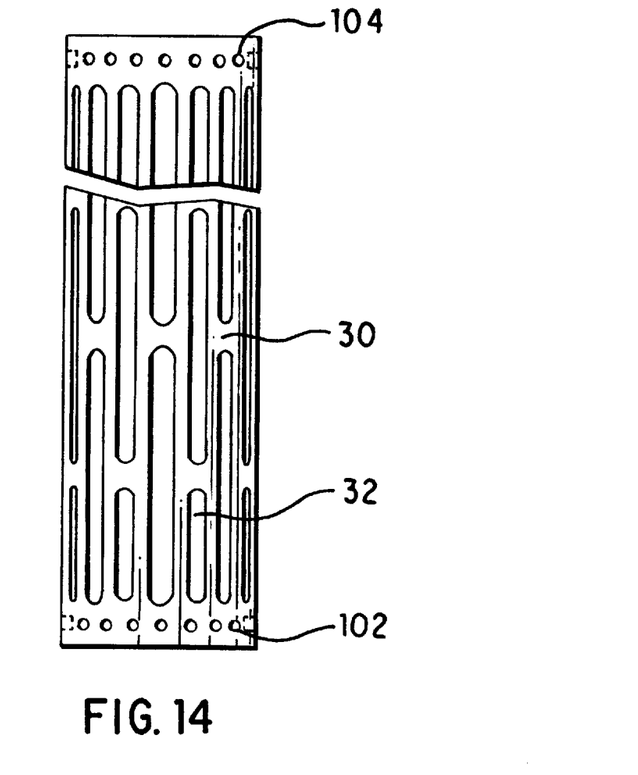
FIG. 14 illustrates a side perspective view of the exo-skeleton of the embodiment of FIG. 1.

Recesses 100 within bellows bulkhead 44 allow exoskeleton 30 to be secured to bulkhead 44 by screws that pass through the corresponding openings 102 within exoskeleton 30 (shown in FIG. 14). Coupler bulkhead 54 (depicted in FIG. 15) is used to couple adjoining assembled cavities 49. Internal passage 102 allows for fluid communication between attached cavities 49, and also allows for leads 68 and 70 to pass through from one cavity 49 to the next. Two sets of recesses 108, 110 correspond to openings 102 and 104 of adjacent exo-skeletons 30 allowing them to be connected by, for example, a screw. It will be appreciated that where a single crystal cavity 49 is desirable for a given application, coupler bulkhead 54 would be unnecessary.

Figure 16:
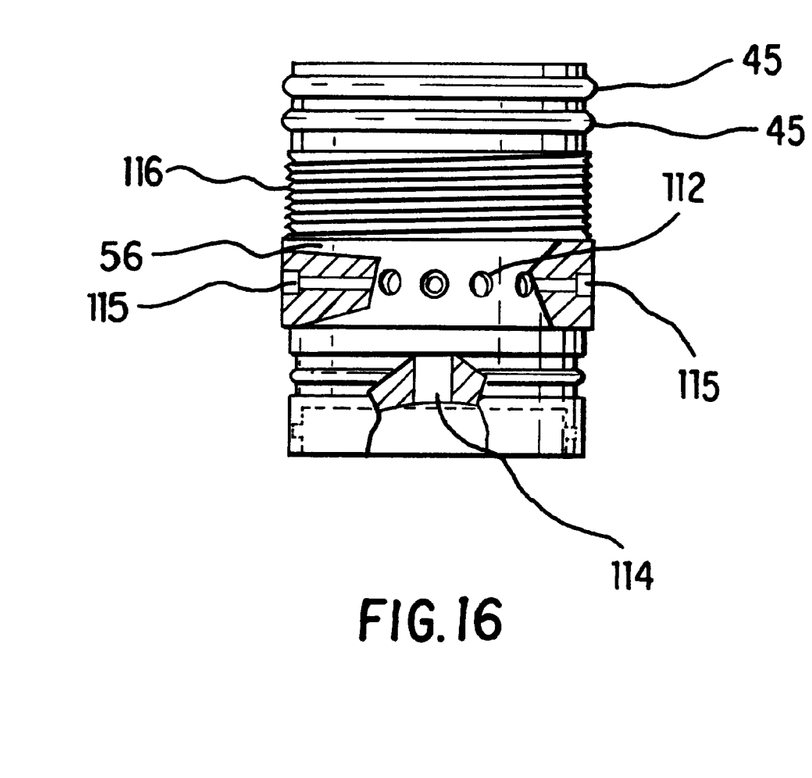
FIG. 16 illustrates an adapter.

FIG. 16 depicts the bulkhead upper adapter 56. Bulkhead upper adapter 56 has a plurality of recesses 112 which allow exo-skeleton 30 to be secured to it by screws through corresponding openings 104 on exo-skeleton 30. Internal passage 114 extends longitudinally into bulkhead upper adapter 56, and external ports 115, which allow for the addition and release of fluid from the sealed chamber. A threaded portion 116 is located on the upperportion of bulkhead 56. The threaded portion 116 of bulkhead upper adapter 56 threadably engages the threaded portion 118 of coupler crossover 58. The smooth inner walls 120 of coupler crossover 58 slidably engage and seal against the O-rings 45 located at the upper portion of bulkhead upper adapter 56.

Figure 16A:
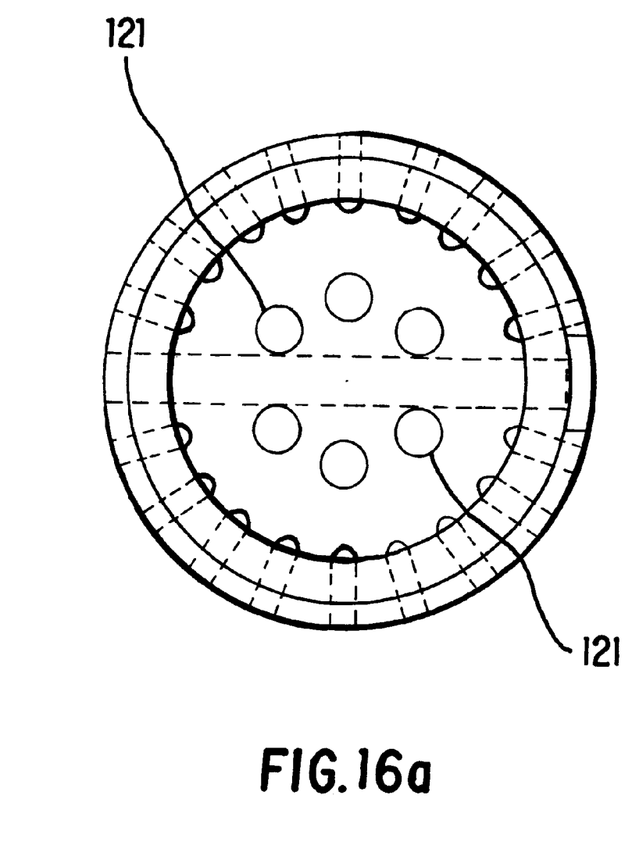
FIG. 16a illustrates a plan view of the adapter of FIG. 16.
Figure 17:
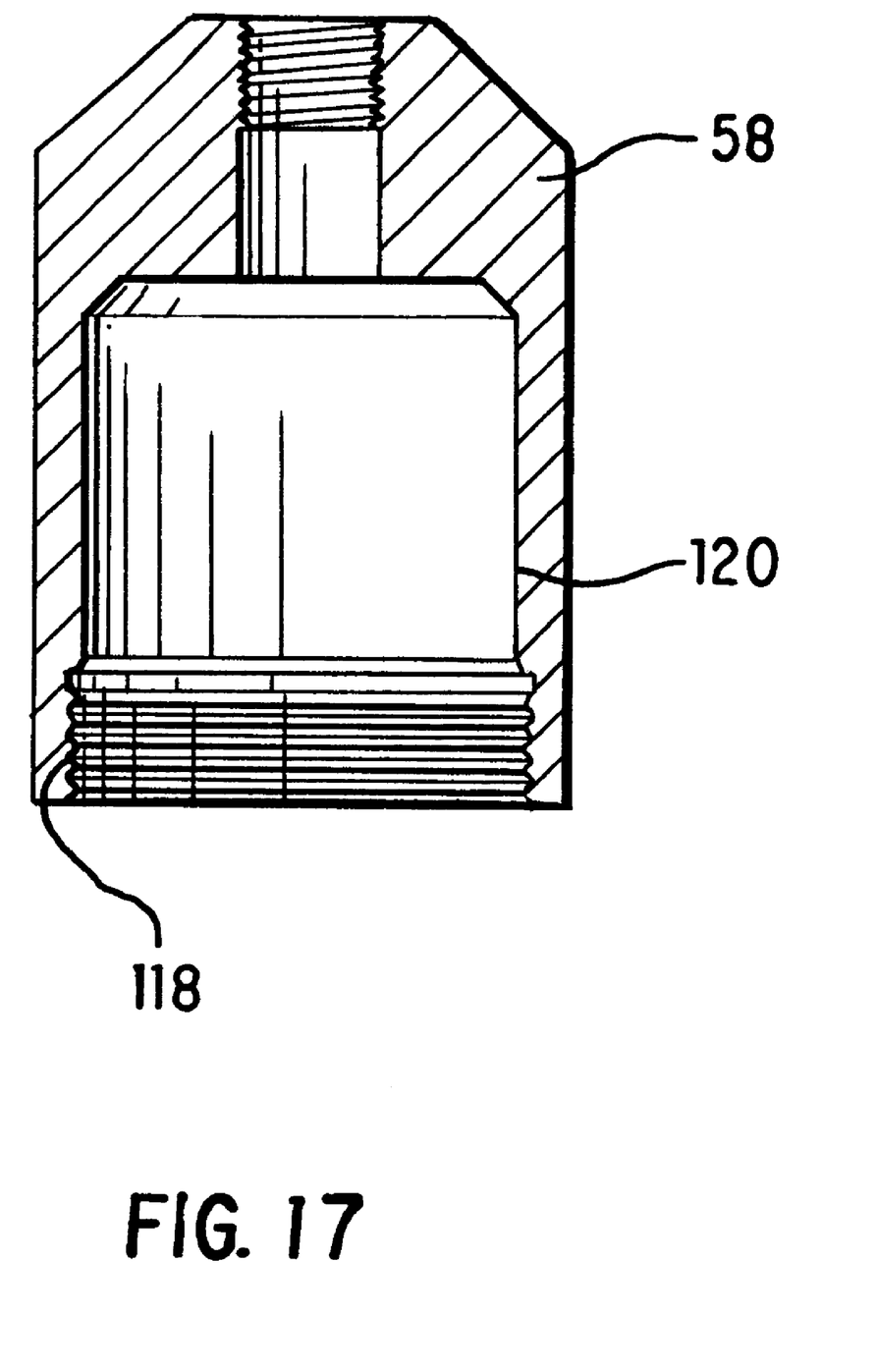
FIG. 17 illustrates a section of the crossover illustrated in FIG. 2.

FIG. 16a depicts internal leads 121, which extend through upper adapter, and make electrical contact with internal leads 68 and 70. Internal leads 121 receive the electrical signal from coupler crossover 58, which receives the signal from waveform generator 22 and power amplifier 24 through wire-line 25 and head 26.

Figure 18:
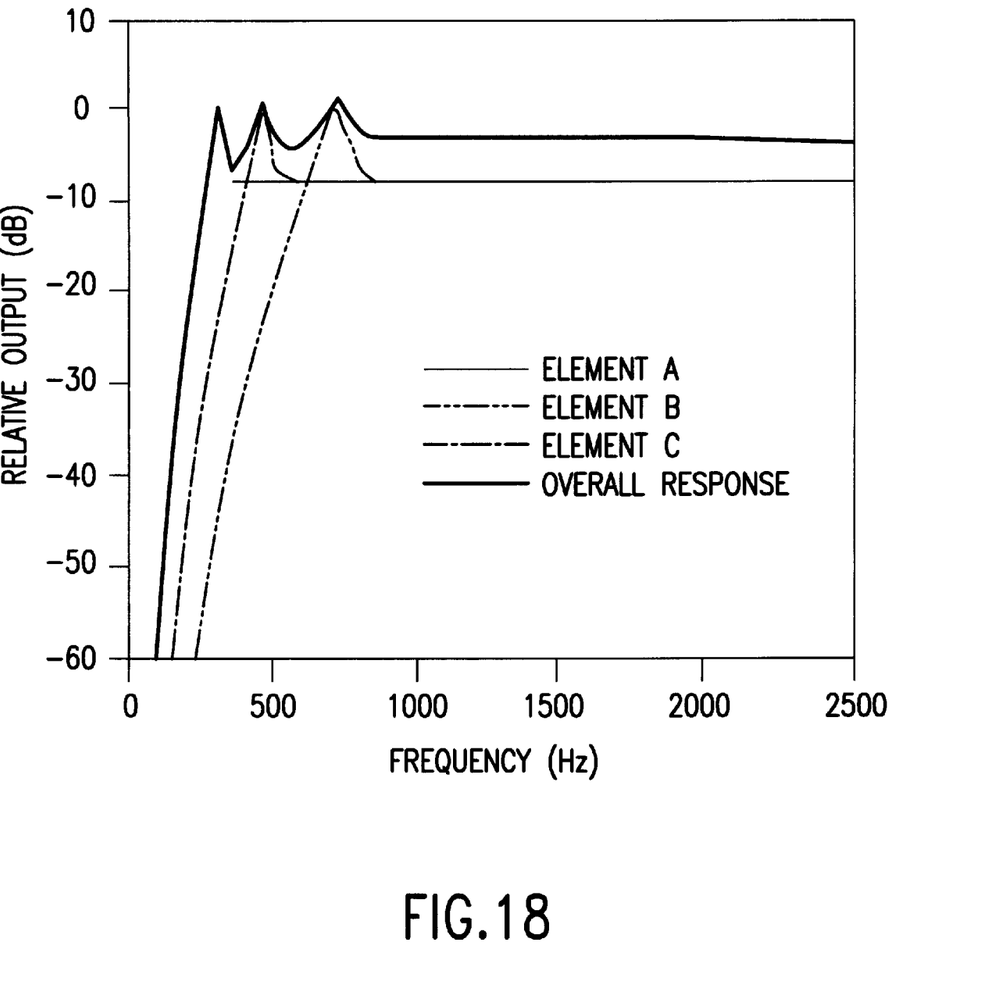
FIG. 18 illustrates a plot of frequency versus relative output.

FIG. 18 is a plot of the source 20 output, with output power measured as a function of frequency. In operation, the waveform generator 22 is set to produce a frequency sweep from 200 to 4,000 Hz. The frequency sweep signal is amplified in the power amplifier 24 to produce a signal in the wireline cable 25. The signal is received at the conductor crossover 58, where it passes through leads 68 and 70, into the crystal cavity(s) 49. The signal 122 produced as a result of exciting both cavities of a configuration with two coupled cavities 49 is shown. The resulting signal for either of the two cavities 49 individually are depicted by waveforms 124 and 126.

In operation, several relatively low-frequency elements are used to provide resonance peaks at lower frequencies in the longitudinal resonant mode. The summation of the higher frequency plateau energy from the hoop mode of each element provides adequate broad band high frequency energy to replace the high frequency elements in conventional multiple element designs.

Each of the elongated cavities 49 in the half-wave mode has a known associated resonant frequency, according to the equation:

$$of = V/2L$$

where of=cavity resonant frequency, V=velocity of sound in the internal fluid, and L=the length of the cavity. Assembling one or more cavities of desired resonant frequencies provides enhanced power output at the resonant frequency. The outwardly presented surfaces of the piezoceramic cylinders that make up the cavity 49 provide a broadband source of energy at frequencies above the resonant frequency of the cavity 49.

It will be appreciated that alternative embodiments can be practiced without departing from the present invention. For example, the cavities 49 can easily be assembled to produce the quarter wave, full wave or other fractional mode resonances.

Thus, the preferred embodiment employs cylindrical shells of active piezoceramic material as the active resonant element of the energy source. These individual piezoceramic cylindrical shells are arranged into an elongated cylinder (cavity), and sealed within metallic bladders. The bladders contain an appropriate low acoustic velocity liquid that facilitates the propagation of seismic waves into the borehole and the surrounding area.

The stacked piezoceramic elements are energized by a waveform generator and an associated power amplifier, which can be located in the source housing, but usually is located remotely, outside the borehole. The waveform generator and associated power amplifier send the electrical signal to the crystals through a wireline cable and leads attached to the surface of each individual crystal.

The elongated piezoceramic cylinder, or cavity, when operated in a fluid of known acoustic velocity inside the bladders has an associated resonant frequency of=V/2L in the half-wave mode, where L is the length of the cavity and V is the velocity of sound in the fluid. Both ends of the cavity are open to produce the half-wave resonance. A quarter-wave resonance is produced by closing one end and opening the other, producing a resonant frequency of=V/4L.

The same length cavity can produce a lower frequency resonance in the quarter-wave mode than in the half-wave mode. At the resonant frequency, the displacement of the cylinder (cavity) when operated, and therefore, the power output, can be many times greater than the output if resonance was not present. Therefore, resonant frequencies at lower frequencies below 700 to 1,000 Hz can overcome the lack of low-frequency power output in previous piezoceramic designs. The resonant frequencies of 250 to 400 Hz can add one to two octaves of output to the broadband response of a piezoceramic source.

In one such resonant cavity source, a large number of resonant cavities could be used so that the sum of their outputs would cover a broad frequency range, e.g., 250 Hz to 2,000 Hz. In such a design, 10 to 40 cavities of varying lengths could be used. However, the resulting design would have a length of 30 or more feet, violating the underlying point source assumption for the frequencies of interest in borehole seismic logging. Alternatively, the cavities could be lengthened using non-piezoceramic materials for part of the cavity, thereby lowering the resonant frequency and sharpening the resonance peak.

Accordingly, stimulation with electrical signals having frequencies above the resonant frequency of the cavity is employed. The outwardly presented surfaces of the piezoceramic cylinders comprising the cavity operate in the hoop mode as a non-resonant, broadband source of energy. This phenomenon is present at all frequencies above the resonant frequency of the cavity. A plateau of energy above the resonance frequency is thereby created. The present invention thus teaches an apparatus that acts as a dual mode energy source, utilizing both the resonance frequency of the piezoceramic cavity(s) for higher output at lower frequencies, and the hoop mode for broadband output at higher frequencies.

A borehole energy source that uses both resonance and the hoop mode of the piezoceramic to replace the high frequency elements in conventional multiple element designs and produce a relatively short source with higher output at lower frequencies is thus disclosed. The signal generated at the earth's surface and sent to the tool is a frequency sweep signal, where the frequency of the input electric signal is swept over a desired frequency range (for example 250 Hz to 2 kHz). The dual mode energy source of the present invention is able to use the resonant frequency of the piezoceramic cavity, as well as the hoop mode at frequencies above resonance to produce a plateau of energy above the resonance frequency.

This arrangement reduces the number of piezoceramic cavities necessary to produce seismic waves over the desired band of frequencies. This allows for a simpler design, less components, and a smaller energy source. The piezoceramic crystals of the present invention are housed within a metallic bladder. This metallic bladder is able to withstand the corrosive environment of the borehole, without adversely impacting the ability of the energy source to transmit seismic waves into the borehole.

The invention therefore provides a dual mode multiple-element resonant cavity piezoceramic borehole energy source. The foregoing detailed description described the preferred embodiment of the invention. It is clear, however, that the preferred embodiment may be variously modified. Therefore, to particularly point out and distinctly claim the subject matter regarded as invention, the following claims conclude the specification.

We claim:

1. A seismic wave generator comprising:
   a liquid-filled elongated column having a resonant cavity borehole energy source and defining a longitudinal axis, the column having a resonant frequency; and
   a resonator comprising at least one substantially cylindrical piezoelectric element having an axis approximately parallel to the axis of said column for inducing seismic waves in said column; said resonator being constructed and arranged for vibrating at said first resonant frequency and for vibrating at a second frequency in a hoop mode for generating seismic waves having said second frequency, whereby the generator is operable as a dual mode energy source by stimulating the generator with electrical signals having frequencies above the resonant frequency, thereby utilizing, both the resonant frequency of the cavity for higher output at lower frequencies and the hoop mode for broadband output at higher frequencies.

2. A seismic wave generator as described in claim 1, wherein the liquid-filled elongated column is substantially cylindrical.

3. A seismic wave generator as described in claim 1, wherein the liquid-filled elongated column further comprises an upper end, a lower end, and an outer surface;

the resonant cavity borehole energy source having at least one exo-skeleton section defining a portion of the outer surface of the resonant cavity borehole energy source, the exo-skeleton having elongated apertures therein and having a length selected in accordance with the desired operational frequencies of the resonant cavity borehole energy source, the resonant cavity borehole energy source defining a liquid-receiving volume which is constructed and arranged to receive a substantially incompressible fluid.

4. A seismic wave generator as described in claim 3, wherein the resonator is contained within the exo-skeleton and is constructed and arranged to translate an electrical signal to acoustic energy which passes through the elongated apertures.

5. A seismic wave generator as described in claim 4, further comprising a wave-producing subassembly having a waveform generator for providing an electrical input to a power amplifier; a power amplifier for amplifying said electrical input and providing an electrical output; a wire-line constructed and arranged to suspend the cavity borehole energy source within a borehole and to house two leads which conduct the electrical output from the power amplifier to the resonant cavity borehole energy source; and a coupling head for providing electrical connection between the wire-line and the resonant cavity borehole energy source.

6. A seismic wave generator as described in claim 5, wherein the exo-skeleton is substantially cylindrical and has an inner diameter of approximately 3.625 inches and a thickness of about 0.5 inches.

7. A seismic wave generator as described in claim 3, wherein the resonant cavity borehole energy source further has a bellows housing located distal to and connected to the exo-skeleton and having a lower end; the bellows housing further containing sealed bellows constructed and arranged to permit a low velocity liquid within the resonant cavity borehole energy source to expand and contract as a result of elevated temperatures within the borehole and the differential expansion between the fluid inside the source and the fluid inside the borehole.

8. A dual mode multiple-element resonant cavity piezoceramic borehole energy source comprising, in combination:

a resonant cavity borehole energy source having an upper end, a lower end, and an outer surface;

the resonant cavity borehole energy source having at least one exo-skeleton section defining a portion of the outer surface of the resonant cavity borehole energy source, the exo-skeleton having elongated apertures therein and having a length selected in accordance with the desired operational frequencies of the resonant cavity borehole energy source, the resonant cavity borehole energy source defining a liquid-receiving volume which is constructed and arranged to receive a substantially incompressible fluid;

at least one piezoceramic element contained within the exo-skeleton constructed and arranged to generate acoustic energy which passes through elongated apertures;

whereby the exo-skeleton is constructed and arranged to define a longitudinal axis and has a resonant frequency; and the piezoelectric element having an axis approximately parallel to the axis of the exo-skeleton for inducing seismic waves in the exo-skeleton, the resonant cavity borehole energy source being constructed and arranged for vibrating at said first resonant frequency and for vibrating at a second frequency in a hoop mode for generating seismic waves having said second frequency.

* * * * *